May 6, 1924.
W. B. STONE
1,492,816
RETAINER FOR STORAGE BATTERY MATERIAL
Filed Jan. 25, 1923     2 Sheets-Sheet 1
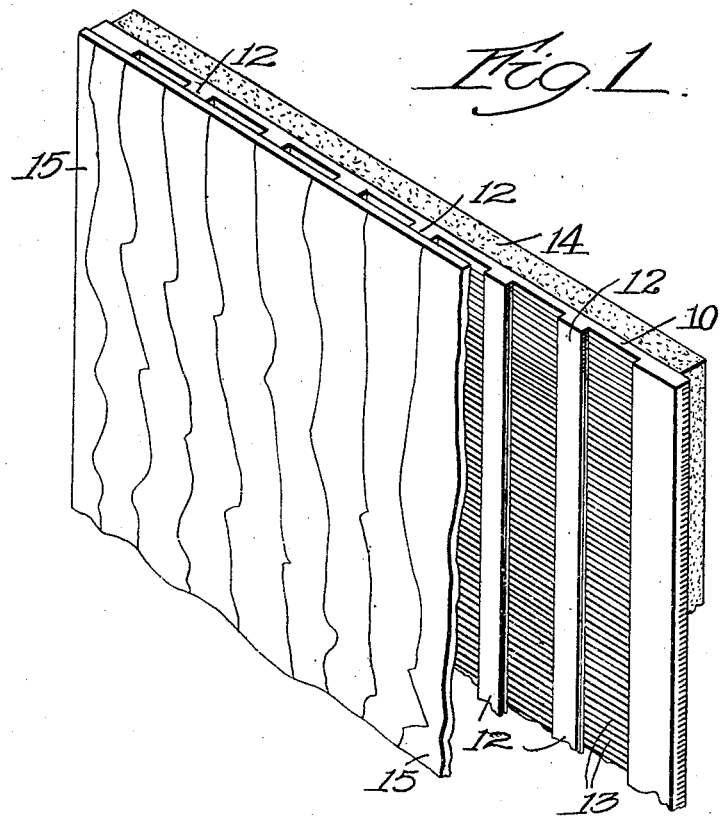
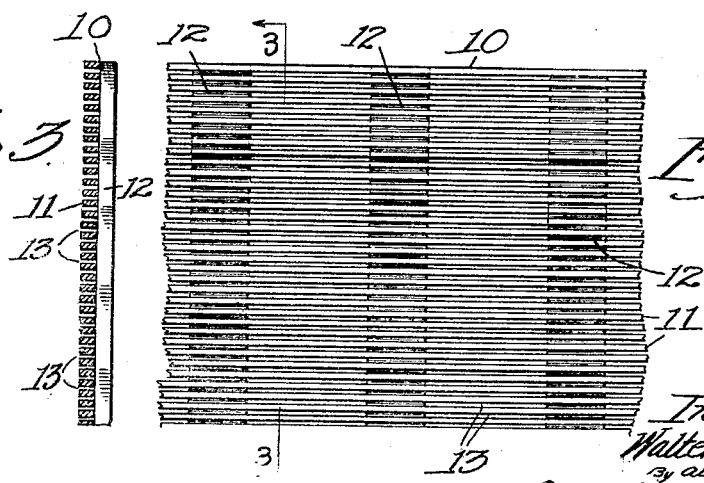

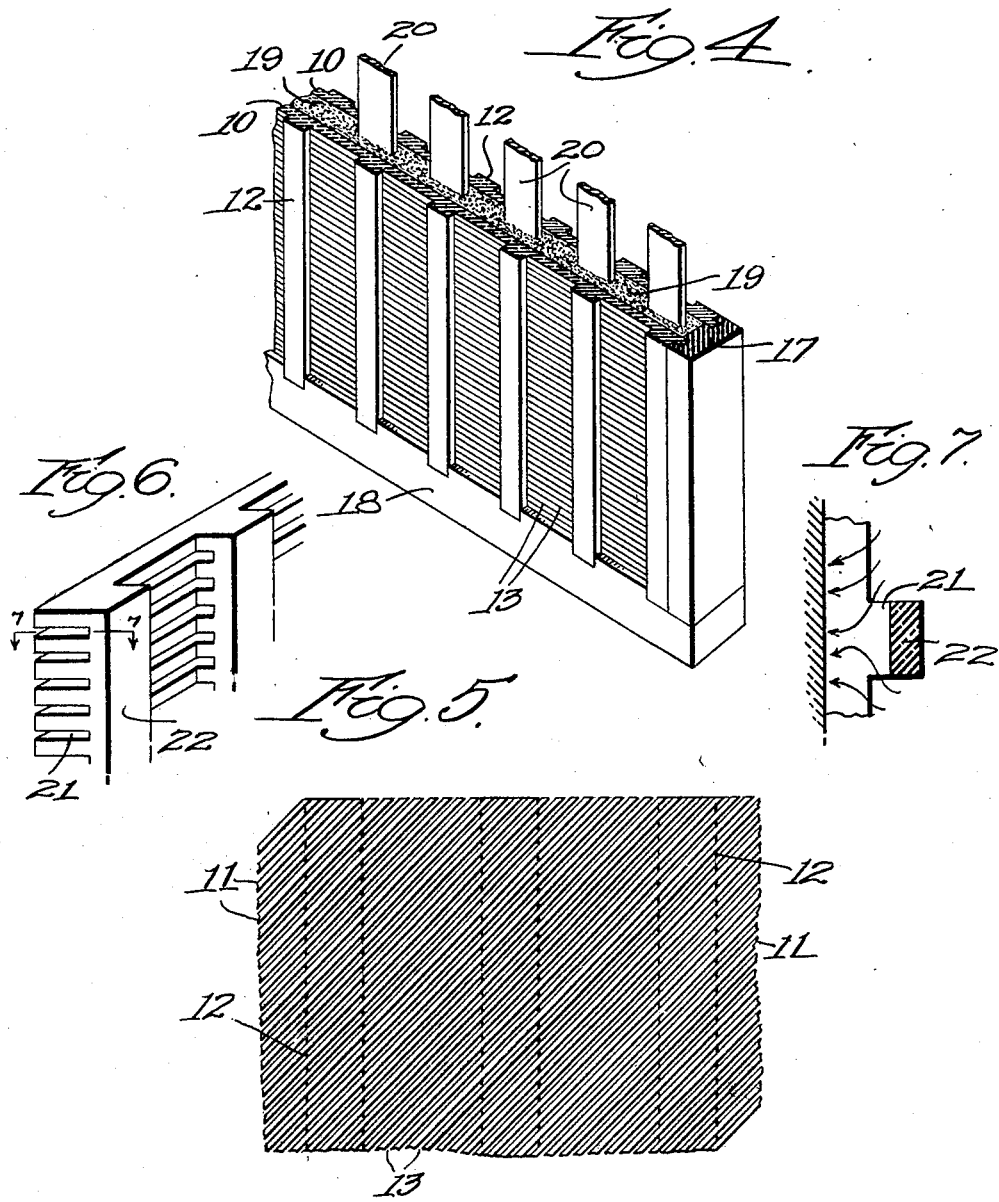

Patented May 6, 1924.

1,492,816

UNITED STATES PATENT OFFICE.

WALTER B. STONE, OF WEBSTER, MASSACHUSETTS.

RETAINER FOR STORAGE-BATTERY MATERIAL.

Application filed January 25, 1923. Serial No. 614,731.

*To all whom it may concern:*

Be it known that I, WALTER B. STONE, a citizen of the United States, residing at Webster, in the county of Worcester and State of Massachusetts, have invented a new and useful Retainer for Storage-Battery Materials, of which the following is a specification.

This invention relates to a storage battery and particularly to an improved material retaining device for use therein. Such a retaining device should have two very important functions, namely, to assist in supporting and retaining the active material of the battery plates and also to give free access of the electrolyte to the active material, without materially decreasing the necessary diffusion of the electrolyte through the material in any part of the plate. It should further permit the escape of gases produced in the body of active material during charge.

The retainer should preferably be of such material that it will outlast the plates with which it is used, and it is commonly a non-conductor of electricity.

It is the object of my invention to provide an improved form of retaining device for this purpose which will perform these important functions in a manner greatly superior to any device heretofore used for this purpose.

A second object is to provide a retaining device which may be economically manufactured and which will be strong and reliable in use.

A third object is to combine a pair of my improved retaining devices in a casing or containing envelope within which the active material of a battery plate may be retained, together with a suitable grid and connections to be embedded therein.

Preferred forms of my invention are shown in the drawings in which—

Fig. 1 is a partial perspective view showing my improved retaining device assembled with certain battery parts;

Fig. 2 is a front elevation of a portion of my improved retaining device;

Fig. 3 is a vertical sectional view taken along the line 3—3 in Fig. 2;

Fig. 4 is a partial perspective view of my invention embodied in a casing or envelope for a battery plate;

Fig. 5 is a detail view of a slight modification;

Fig. 6 is a detail perspective view of a further modification; and

Fig. 7 is a detail sectional view taken along the line 7—7 in Fig. 6.

Referring to the drawings, my improved retaining device 10 is preferably formed of hard rubber or similar material, and comprises a series of horizontally extending ribs or strips 11 on one side and a series of vertically extending ribs 12 on the opposite side. The narrow slots or grooves 13 between the strips 11 extend continuously entirely across the plate from one edge to the other and are arranged in closely parallel relation, as clearly shown in the drawings. These slots or grooves are not interrupted or diminished in depth where they cross the vertical ribs 12. These ribs 12 are left substantially intact and form connecting members which support the narrow strips 11 which are otherwise separated by the slots 13. The slots may be formed by sawing with a very thin saw or may be formed in any other convenient manner.

The retaining device when in use is disposed with its ribs 11 adjacent the battery plate 14, as indicated in Fig. 1, and a thin wooden sheet or diaphragm 15 may be placed against the ribs 12 on the opposite face of the retainer.

With this arrangement, it will be seen that the ribs 12 have no contact with the battery plates and that the electrolyte has free access to the active material through the openings 13 throughout the full width of the plates. The slots 13 are relatively narrow, so that the strips 11 will firmly support the active material in the battery plates. The vertical ribs 12 and the wooden diaphragm 15 also form vertically extending passages at the back of the retaining device for conducting battery gases to the surface of the electrolyte.

The relation of the openings 13 and strips 11 is uniform over the entire surface of the active material and is such that the presence of the strips does not materially reduce the chemical activity of the battery.

In Fig. 4, I have shown two retaining devices 10 combined with end members 17, a bottom member 18 and a similar top member (not shown) to form a receptacle or pocket for the active material 19. Conducting strips 20 extending upward form part of a suitable grid or other device embedded in the active material within the pocket, thus providing a connection to the battery terminal. With this construction, each pair of retaining devices with its enclosed material and conducting structure constitutes a separate and complete unit, which may be most conveniently handled.

In Fig. 5, I have shown a modified form of retaining device in which the ribs or strips 11 are disposed diagonally of the vertical ribs 12, instead of horizontally.

In Figs. 6 and 7, I have shown another modification in which the saw cuts or grooves 21 extend partially into the ribs 22, thus affording even freer access of the electrolyte to the active material, as indicated by the arrows in Fig. 7.

Having thus described certain forms of my invention and the advantages thereof it will be evident that changes and modifications can be made therein by those skilled in the art within the spirit and scope of my invention as set forth in the claim and I do not wish to be otherwise limited to the details herein disclosed but what I claim is:—

A retaining device for the active material of a battery plate, comprising a plurality of strips of thin material extending from edge to edge of the device and separated by very narrow continuous openings between adjacent strips, and a plurality of spaced connecting ribs crossing said strips in a different plane and at an angle thereto, said ribs being relatively widely separated and being effective to hold said strips in closely spaced parallel relation.

In testimony whereof I have hereunto affixed my signature.

WALTER B. STONE.